United States Patent [19]

Azzara

[11] Patent Number: 4,665,728
[45] Date of Patent: May 19, 1987

[54] STRAP TO COVER IGNITION LOCK CYLINDER

[76] Inventor: Frank Azzara, 116 Riegelman St., Staten Island, N.Y. 10302

[21] Appl. No.: 860,897

[22] Filed: May 8, 1986

[51] Int. Cl.⁴ .............................................. E05B 17/14
[52] U.S. Cl. ........................................ 70/427; 70/160; 70/DIG. 63
[58] Field of Search ................ 70/427, 428, 425, 423, 70/18, 237, 160, 161, 162, DIG. 63

[56] References Cited

U.S. PATENT DOCUMENTS

| | | | |
|---|---|---|---|
| 4,167,222 | 9/1979 | ElBindari | 70/237 |
| 4,187,706 | 2/1980 | Hill | 70/428 |
| 4,426,859 | 1/1984 | Floyd | 70/427 |

Primary Examiner—Robert L. Wolfe
Attorney, Agent, or Firm—Richard L. Miller

[57] ABSTRACT

A strap to cover an ignition lock cylinder is provided and consists of a hollow housing having a lockable cover pivoted thereon to encompass the ignition lock cylinder. The housing is secured to a steering post by a band that fits around the post and into the hollow housing to be affixed therein. When the cover is closed and locked the ignition lock cylinder is prevented from being used. When the cover is unlocked and opened the ignition lock cylinder can be operated without completely removing the strap from the steering post.

4 Claims, 4 Drawing Figures

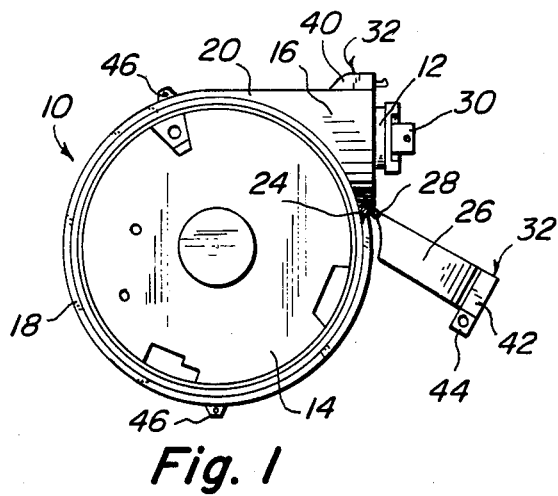
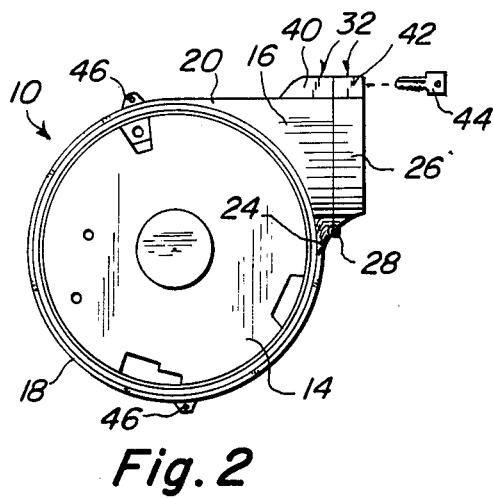
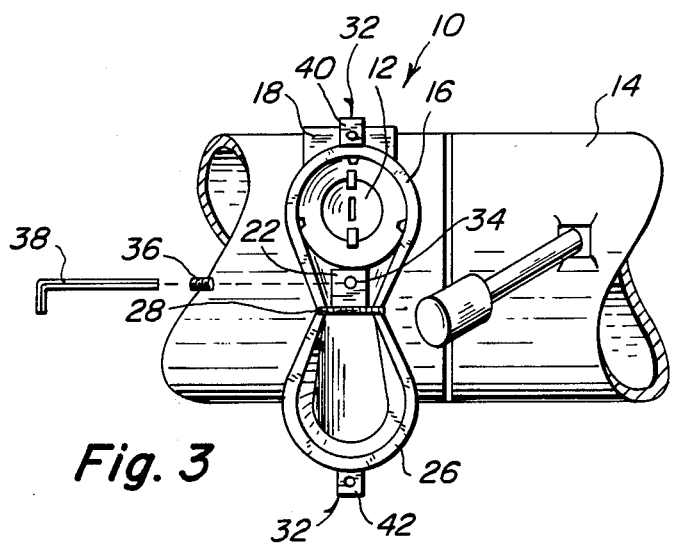
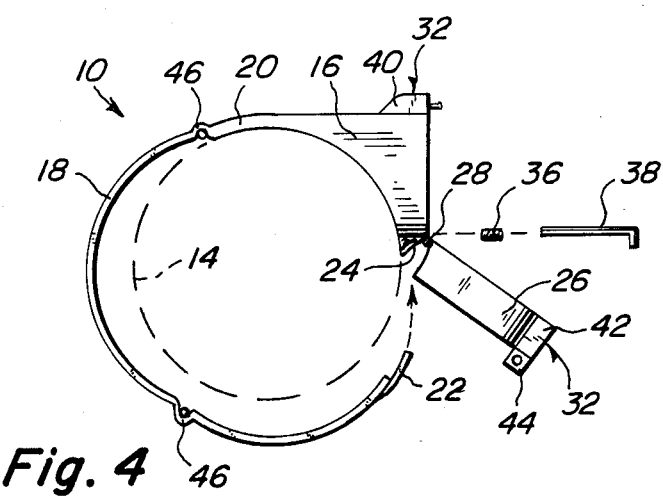

STRAP TO COVER IGNITION LOCK CYLINDER

BACKGROUND OF THE INVENTION

The instant invention relates generally to automobile anti-theft locks and more specifically it relates to a strap to cover an ignition lock cylinder.

Numerous automobile anti-theft locks have been provided in prior art that are adapted to be attachable on a steering post for covering the ignition lock preventing insertion of a key to start the engine. For example, U.S. Pat. Nos. 4,008,589 and 4,008,590 are illustrative of such prior art. While these units may be suitable for the particular purpose to which they address, they would not be as suitable for the purposes of the present invention as heretofore described.

SUMMARY OF THE INVENTION

A primary object of the present invention is to provide a strap to cover an ignition lock cylinder that will overcome the shortcoming of the prior art devices.

Another object is to provide a strap to cover an ignition lock cylinder that is quickly attachable to and removable from the steering post and ignition lock cylinder so that a thief cannot start the engine, use the electrical system or turn the steering wheel of the automobile.

An additional object is to provide a strap to cover an ignition lock cylinder that includes a lockable cover over the ignition lock cylinder so that the lockable cover can be opened to operate the ignition lock cylinder without completely removing the strap from the steering post.

A further object is to provide a strap to cover an ignition lock cylinder that is simple and easy to use.

A still further object is to provide a strap to cover an ignition lock cylinder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a side view of the cylinder invention mounted on a steering post over the ignition lock cylinder with ignition key therein and cover open so that the ignition key can be turned to start the engine.

FIG. 2 is a side view similar to FIG. 1 but with the cover closed so that the ignition key cannot be turned to start the engine.

FIG. 3 is a side view of a steering post with the invention mounted thereon and with the cover open.

FIG. 4 is a side view showing how the band can be installed around the steering post.

DETAILED DESCRIPTION OF THE PREFERRED EMBODIMENTS

Turning now descriptively to the drawings, in which similar reference characters denote similar elements throughout the several views, FIGS. 1 through 4 illustrate a strap 10 to cover an ignition lock cylinder 12 in a steering post 14 of an automobile (not shown).

The strap 10 consists of a hollow housing 16 to fit over the ignition lock cylinder 12 in the steering post 14. An elongated band 18 extends from one side 20 of the housing 16 to fit around the steering post 14 so that free end 22 of the band 18 can enter into opposite side 24 of the housing 16 and be secured therein.

A cover 26 is pivotally connected at 28 to the housing 16 to encompass the ignition lock cylinder 12 in a closed position (see FIG. 2) and exposes the ignition lock cylinder in an open position (see FIG. 1) so that an ignition key 30 can be inserted therein.

A lock mechanism 32 is provided for locking the cover 26 in the closed position to prevent an unauthorized person from starting the engine using the electrical system and turning the steering wheel of the automobile.

The free end 22 of the band 18 has a transverse aperture 34. Threadably mounted in the housing, a headless set screw 36 engages the aperture in the free end of the band after the free end 22 is inserted into the opposite side 24 of the housing 16. An ALLEN ® wrench 38 is used for driving the set screw 36 into the aperture (not shown) in the free end 22 of the band 18 for holding the free end within the housing 16.

The lock mechanism 32 has a first portion 40 affixed to the housing 16 and a second mating portion 42 affixed to the cover 26. A key 44 is inserted into the second mating portion 42 after the cover 26 is in the closed position so that the key 44 can lock mechanism 32 and be removed therefrom.

The band 18 further includes pivot joints 46 to assist the band in fitting around the steering post 14. The housing 16, the band 18, the cover 26 and the lock mechanism 32 are all fabricated out of harden steel so as to prevent a thief from breaking into the strap 10 and operating the ignition lock cylinder 12.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A strap to cover an ignition lock cylinder in a steering post of an automobile, said strap comprising:
    (a) a hollow housing to fit over said ignition lock cylinder in said steering post;
    (b) an elongated band extending from one side of said housing to fit around said steering post so that free end of said band can enter into opposite side of said housing;
    (c) means for securing said free end of said band within said housing, wherein said securing means includes:
        (i) said free end of said band having a transverse aperture;
        (ii) a headless set screw for engaging said aperture in said free end of said band after said free end is inserted into said opposite side of said housing; and
        (iii) an ALLEN ® wrench for driving said set screw into said aperture in said free end of said band for holding said free end within said housing;

(d) a cover pivotally connected to said housing to encompass said ignition lock cylinder in a closed position and exposing said ignition lock cylinder in an open position so that an ignition key can be inserted therein; and (e) means for locking said cover in said closed position so as to prevent a person from starting an engine, using an electrical system and turning a steering wheel of said automobile.

2. A strap as recited in claim 1 wherein said locking means includes:

(a) a lock mechanism having a first portion affixed to said housing and a second mating portion affixed to said cover; and (b) a key to be inserted into said second mating portion after said cover is in said closed position so that said key can lock said lock mechanism with said cover in said closed position, and be removed therefrom.

3. A strap as recited in claim 2 wherein said band further comprises at least one pivot joint to assist said band in fitting around said steering post.

4. A strap as recited in claim 3 wherein said housing, said band, said cover and said lock mechanism are all fabricated out of hardened steel to make it difficult for a thief to break said strap and operate said ignition lock cylinder.

* * * * *